United States Patent [19]

Oda et al.

[11] 4,307,198

[45] Dec. 22, 1981

[54] LOW-EXPANSION CERAMICS AND METHOD OF PRODUCING THE SAME

[75] Inventors: Isao Oda; Tadaaki Matsuhisa, both of Nagoya, Japan

[73] Assignee: NGK Insulators, Ltd., Nagoya City, Japan

[21] Appl. No.: 152,317

[22] Filed: May 22, 1980

[30] Foreign Application Priority Data

Mar. 19, 1980 [JP] Japan .................. 55/33897

[51] Int. Cl.$^3$ ................ C04B 35/04; C04B 35/10; C04B 35/44; C04B 35/46

[52] U.S. Cl. ........................... 501/119; 252/477 R; 264/314; 501/120; 501/134; 501/136

[58] Field of Search ................. 106/73.33, 62

[56] References Cited

U.S. PATENT DOCUMENTS

| | | | |
|---|---|---|---|
| 2,776,896 | 1/1957 | Harman et al. | 106/73.33 |
| 3,578,471 | 5/1971 | Lachman | 106/73.33 |
| 3,625,717 | 12/1971 | Grubba et al. | 106/73.33 |
| 4,017,347 | 4/1977 | Cleveland | 106/39.5 X |
| 4,277,539 | 7/1981 | Keller et al. | 106/73.33 |

*Primary Examiner*—Helen M. McCarthy
*Attorney, Agent, or Firm*—Stevens, Davis, Miller & Mosher

[57] ABSTRACT

The present invention relates to low-expansion ceramics having a chemical composition of the ceramics essentially consisting of 2 to 20% by weight of magnesia (MgO), 10 to 68% by weight of alumina ($Al_2O_3$), and 30 to 80% by weight of titanium in terms of titanium oxide ($TiO_2$), wherein the major component of crystalline phase thereof is magnesium-alumium-titanate phase, and the ceramics have a coefficient of thermal expansion of not more than $20 \times 10^{-7}$ (1/°C.) in a temperature range of 25° C. to 800° C. and a melting point of not lower than 1,500° C., wherein the magnesium-alumium-titanate phase as the major component of the crystalline phase thereof is given by a chemical formula $Mg_{10x}Al_{8y}Ti_{5(1-x-y)}O_{(10+2y)}$, here $0.02 \leq x \leq 0.20$, $0.10 \leq y \leq 0.68$, and $0.20 \leq (x+y) \leq 0.70$, and a method of producing low-expansion ceramics, said method comprising steps of preparing a batch of compounds so as to provide a chemical composition of 2 to 20% by weight of magnesia, 10 to 68% by weight of alumina, and 30 to 80% by weight of titanium in terms of titanium oxide ($TiO_2$); plasticizing the batch if necessary and shaping the batch by a means selected from the group consisting of extrusion, pressing, slip casting, and injection molding; drying the body thus formed; and firing the shaped body at 1,300° C. to 1,700° C. for 0.5 to 48 hours, whereby ceramics have a magnesium-aluminum-titanate phase as main component of crystalline phase thereof, a coefficient of thermal expansion of not more than $20 \times 10^{-7}$ (1/° C.) in a temperature range of 25° C. to 800° C., and a melting point of not lower than 1,500° C.

The ceramics of the invention can be widely used as ceramics material in the fields where high degree of heat-resistance, thermal shock-resistance, wear-resistance and corrosion-resistance are required.

12 Claims, 1 Drawing Figure

LOW-EXPANSION CERAMICS AND METHOD OF PRODUCING THE SAME

BACKGROUND OF THE INVENTION

This invention relates to low-expansion ceramics having a small coefficient of thermal expansion, an excellent thermal shock-resistance, and an excellent heat-resistance.

With the progress of technology in recent years, demand for material having an excellent thermal shock-resistance and an excellent heat-resistance is increasing. The thermal shock-resistance of ceramics depends on characteristics of the materials, such as the coefficient of thermal expansion, the heat conductivity, the mechanical strength, the Young's modulus, and the Poisson's ratio. The thermal shock-resistance is also affected by the size and shape of the goods concerned and the conditions of heating and cooling or the rate of heat propagation. Among those factors affecting the thermal shock-resistance, the contribution of the coefficient of thermal expansion is especially large, and when the rate of heat propagation is high, the thermal shock-resistance is ruled almost solely by the coefficient of thermal expansion, as well known to those skilled in the art. Accordingly, there is a strong demand for development of low-expansion material with excellent resistance against thermal shock.

As ceramics with a comparatively low thermal expansion, which has a coefficient of thermal expansion in the order of 5 to $20 \times 10^{-7}$ (1/° C.) in a temperature range of 25° C. to 800° C., cordierite (MAS) and lithium-aluminum-silicate (LAS) are known. However, such known ceramics has a low melting point, e.g., the melting point of cordierite is 1,450° C. and that of lithium-aluminum-silicate is 1,423° C. For instance, when the ceramics is used to make ceramic honeycombs for catalyst substrate of catalytic purifying apparatus of automobiles, even the honeycomb substrate using cordierite with a high melting point has been found vulnerable to plugging due to melting if the temperature of the catalyst bed is increased by 100° C. to 200° C. over that of conventional catalyst beds. The increase of the temperature of the catalyst bed is caused by modification of the mounting position of the catalytic converter from the conventional location of under bed to engine proximity for improving the purifying efficiency of the catalyst and by design modification involving the mounting of a turbo-charger for improving the fuel economy and the engine output, which modifications cause an increase in the exhaust gas temperature as compared with that of conventional apparatus. Accordingly, the development of low-expansion material having an excellent heat-resistance, which also has an excellent thermal shock-resistance equivalent to or better than that of cordierite, has been strongly demanded.

BRIEF SUMMARY OF THE INVENTION

The low-expansion ceramics according to the present invention obviates the aforesaid shortcomings and difficulties of the prior art. The inventors have succeeded in achieving the low-expansion characteristics which is equivalent to or better than that of cordierite, by adding titanium dioxide ($TiO_2$) in spinel ($MgO.Al_2O_3$) well known as a high melting point material as shown in FIG. 1, without causing any sizable reduction of the melting point thereof.

An object of the present invention is to provide low-expansion ceramics having a chemical composition of the ceramics essentially consisting of 2 to 20% by weight of magnesia (MgO), 10 to 68% by weight of alumina ($Al_2O_3$), and 30 to 80% by weight of titanium in terms of titanium oxide ($TiO_2$), wherein the major component of crystalline phase thereof is magnesium-aluminum-titanate phase, and the ceramics has a coefficient of thermal expansion or not more than $20 \times 10^{-7}$ (1/° C.) in a temperature range of 25° C. to 800° C. and a melting point of not lower than 1,500° C.

Another object of the present invention is to provide low-expansion ceramics essentially consisting of a magnesium-aluminum-titanate phase as the major component of the crystalline phase thereof which is given by a chemical formula $Mg_{10x}Al_{8y}Ti_{5(1-x-y)}O_{(10+2y)}$, here $0.02 \leq x \leq 0.20$, $0.10 \leq y \leq 0.68$ and $0.20 \leq (x+y) \leq 0.70$.

A further object of the invention is to provide a low-expansion ceramics essentially consisting of a magnesium-aluminum-titanate phase as a major component of the crystalline phase thereof and contains not more than 20% by weight at least one crystal selected from the group consisting of rutile, spinel, and corundum.

A still further object of the present invention is to provide a low-expansion ceramics having a shape of honeycomb structure.

Another object of the present invention is to provide a method of producing low-expansion ceramics comprising steps of preparing a batch of compounds having a chemical composition of 2 to 20% by weight of magnesia, 10 to 68% by weight of alumina, and 30 to 80% by weight of titanium in terms of titanium oxide shaping the batch with or without plasticizing the batch;

drying the body thus formed; and firing the thus shaped article at 1,300° C. to 1,700° C. for 0.5 to 48 hours, whereby ceramics have a magnesium-aluminum-titanate phase as main component of crystalline phase thereof, a coefficient of thermal expansion of not more than $20 \times 10^{-7}$ (1/° C.) in a temperature range of 25° C. to 800° C., and a melting point of not lower than 1,500° C.

Another object of the present invention is to provide a method of producing low-expansion ceramics wherein said compounds having the chemical composition of 2 to 20% by weight of magnesia, 10 to 68% by weight of alumina, and 30 to 80% by weight of titanium in terms of titanium oxide are selected from the group consisting of magnesia, magnesium carbonate, magnesium hydroxide, alumina, aluminum hydroxide, anatase type titanium dioxide, and rutile type titanium dioxide.

According to the present invention, not more than 20% by weight of at least one crystal selected from the group consisting of rutile, spinel, and corundum is contained in the magnesium-aluminum-titanate phase as the major component of the crystalline phase of the ceramics, whereby it is made possible to obtain a higher softening temperature and a higher melting temperature than those of the magnesium-aluminum-titanate alone without deteriorating the low-expansion characteristics inherent to the magnesium-aluminum-titanate. Accordingly, the gradient of the softening-shrinkage curve from the softening temperature to the melting temperature is reduced, and the heat-resistance is improved. Furthermore, the strength of the low-expansion ceramics of magnesium-aluminum-titanate alone can be improved, too.

In this specification, titanium is assumed to be four valency, even though it is able to form non-stoichiometric composition with oxide.

DETAILED DESCRIPTION OF THE INVENTION

Figure 1:
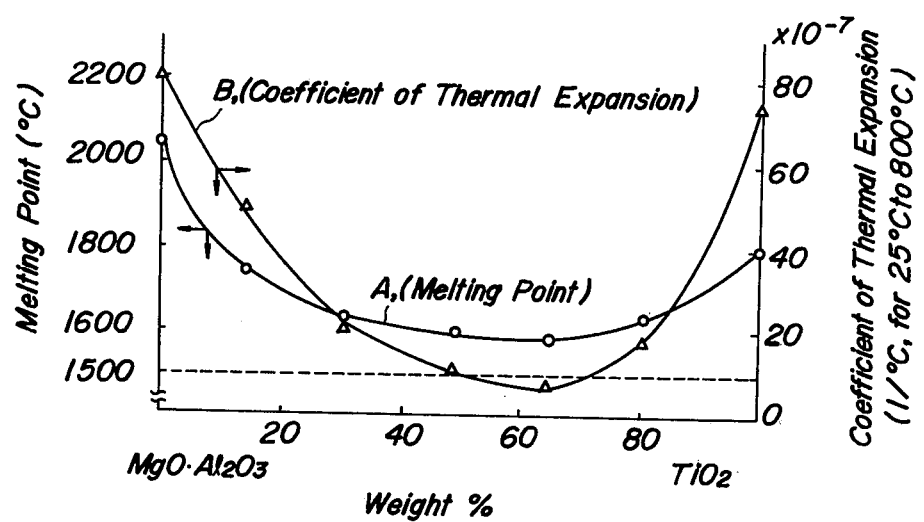
FIG. 1 is a characteristic diagram showing the effects of the amount of titania ($TiO_2$) in ceramics of magnesium-aluminum-titanate system ($MgO \cdot Al_2O_3$-$TiO_2$) on the melting point and the coefficient of thermal expansion thereof, wherein the curve A represents the relationship between the amount of titania ($TiO_2$) and the melting point of the ceramics while the curve B represents the relationship between the amount of titania ($TiO_2$) and the coefficient of thermal expansion of the ceramics in a range of 25° C. to 800° C.

A method of producing the low-expansion ceramics according to the present invention will be now explained. A batch consisting of magnesia, magnesium carbonate, magnesium hydroxide, alumina, aluminum hydroxide, anatase type titanium dioxide, and rutile type titanium dioxide is prepared so as to give a chemical composition of 2 to 20% by weight of magnesia (MgO), 10 to 68% by weight of alumina ($Al_2O_3$), and 30 to 80% by weight of titanium in terms of titanium oxide ($TiO_2$), preferably 3 to 17% by weight of magnesia (MgO), 15 to 62% by weight of alumina ($Al_2O_3$), and 35 to 75% by weight of titanium in terms of titanium oxide ($TiO_2$). If necessary, a plasticizer is added in the batch thus formed for obtaining a batch which is shapable in a plastic manner, and the batch is shaped by a ceramic forming process selected from the processes of extrusion, pressing, slip casting, and injection molding. The shaped body is dried. The dried body is then heated by increasing its temperature at a rate of 5° C./hour to 300° C./hour and fired at 1,300° C. to 1,700° C. for 0.5 to 48 hours. Whereby, the low-expansion ceramics according to the present invention is produced.

The starting materials for the low expansion ceramics of the present invention are not restricted to the aforesaid artificial substances, but various natural materials which consist essentially of the aforesaid chemical composition can be also used for producing the low-expansion ceramics. In this case, impurities other than the major components of the chemical composition, i.e., magnesia (MgO), alumina ($Al_2O_3$), and titania ($TiO_2$) can be generally not more than about 5% by weight.

As pointed out above, the low-expansion ceramics of the present invention can be formed by any of the conventional forming processes available for ceramics. The shape of the final product is not restricted at all: for instance, the final product can be honeycomb body having a thin walled matrix with a plurality of cells extending from one end to the opposite end thereof, and the cross section of the cells of the honeycomb body can be any geometrical form such as triangular, rectangular, hexagonal, any polygonal, circular, or a combination thereof; a complicatedly shaped three-dimensional body, a thick body, a block of various shape, or a body of almost any shape and any structure.

The reasons for the various limitations in the present invention are as follows. The reason for limiting the chemical composition of the ceramics to the range of 2 to 20% by weight of magnesia (MgO), 10 to 68% by weight of alumina ($Al_2O_3$), and 30 to 80% by weight of titanium in terms of titanium oxide ($TiO_2$) is in that this range of the chemical composition provides the magnesium-aluminum-titanate phase with the major component of crystalline phase thereof given by a chemical formula of $Mg_{10x}Al_{8y}Ti_{5(1-x-y)}O_{(10+2y)}$, here $0.02 \leq x \leq 0.20$, $0.10 \leq y \leq 0.68$, and $0.20 \leq (x+y) \leq 0.70$, and provides the low-expansion ceramics with an excellent heat resistance having a coefficient of thermal expansion of not more than $20 \times 10^{-7}$ (1/° C.) in a temperature range of 25° C. to 800° C. and a melting point of 1,500° C. or higher, as can be seen from FIG. 1. Besides, the reason for limiting the preferable range of the chemical composition to 3 to 17% by weight of magnesia (MgO), 15 to 62% by weight of alumina ($Al_2O_3$), and 35 to 75% by weight of titanium in terms of titanium oxide ($TiO_2$) is in that this range of the chemical composition provides a low-expansion magnesium-aluminum-titanate phase having a major component of the crystalline phase thereof given by a chemical formula of $Mg_{10x}Al_{8y}Ti_{5(1-x-y)}O_{(10+2y)}$, here $0.03 \leq x \leq 0.17$, $0.15 \leq y \leq 0.62$, $0.25 \leq (x+y) \leq 0.65$. On the contrary, chemical compositions outside the aforesaid range produce an increased amount of different crystalline phase having a larger thermal expansion than that of the magnesium-aluminum-titanate phase, and produce a coefficient of thermal expansion of greater than $20 \times 10^{-7}$ (1/° C.) and an inferior thermal shock resistance. If the content of magnesia (MgO) exceeds 20% by weight, the melting point becomes too low.

For crystal phases other than the magnesium-aluminum-titanate phase as the major component of the crystalline phase, the present invention has a limitation of not more than 20% by weight of at least one crystal selected from the group consisting of rutile, spinel, and corundum, because this range has effects of improving the softening temperature, the melting temperature, and the strength without deteriorating the low-expansion characteristics. If the amount of the aforesaid other crystal phases exceed the aforesaid 20% by weight, the coefficient of thermal expansion will become greater than $20 \times 10^{-7}$ (1/° C.) in a temperature range of 25° C. to 800° C. and the thermal shock-resistance will be deteriorated.

Examples of the present invention will be now explained.

Referring to Table 1, compositions of Examples 1 through 8 of the invention and References 1 through 3 were prepared by weighing starting materials selected from the group consisting of magnesia, magnesium carbonate, magnesium hydroxide, alumina, aluminum hydroxide, anatase type titanium dioxide, and rutile type titanium dioxide. Two parts by weight of a binder of vinyl acetate system were added to 100 parts by weight of the composition thus prepared, and the binder was mixed thoroughly with the composition, and then rod-shaped test pieces of 10 mm × 10 mm × 80 mm were made by pressing. Separately, honeycomb-shaped bodies with square cell cross section were prepared, by adding 4 parts by weight of methyl cellulose and 30 to 40 parts by weight of water into 100 parts by weight of each of the aforesaid compositions, thoroughly kneading the mixture thus formed by a kneader, extruding the kneaded mixture into honeycomb shape by an extrusion machine, and drying the extruded goods. The rod-shaped test pieces and the honeycomb-shaped bodies thus formed were fired under the firing conditions of Table 1, whereby ceramics of magnesium-aluminum-titanate system of the Examples 1 through 8 of the invention and References 1 through 3 were made. For comparison, cordierite ceramics was used as Reference 4.

The coefficients of thermal expansion in the range of 25° C. to 800° C. and the melting points of the rod-shaped test pieces of the Examples 1 through 8 of the invention and References 1 through 4 were measured. Quantities of the second crystalline phases other than the major crystalline phase of magnesium-aluminum-titanate crystal in the aforesaid rod-shaped test pieces were determined by the X-ray diffraction. Thermal shock tests were applied on the honeycomb-shaped bodies of 100 mm diameter and 75 mm length for the Examples 1 through 8 of the invention and the References 1 through 4 by an electric furnace, and withstanding temperature differences for quick heating and quick cooling without cracks or breakage were determined.

The results are shown in Table 1.

tion; filters for diesel exhaust particulate; industrial or automotive ceramic heat exchangers; engine parts such as pistons, cylinder liners, combustion chambers, auxiliary combustion chambers, turbo-charger rotors or the like; gas turbine parts such as nozzles, rotors, shrouds, scrolls, plenum, burners, tail cylinders, or the like; heat-resistant ceramics materials for receivers of solar energy; various refractory materials; and chinawares and porcelains for chemical industries. Therefore, the present invention contributes greatly to the industry.

What is claimed is:

1. Low-expansion ceramics having a chemical composition of the ceramics essentially consisting of 2 to 20% by weight of magnesia (MgO), 10 to 68% by weight of alumina ($Al_2O_3$), and 30 to 80% by weight of titanium in terms of titanium oxide ($TiO_2$), wherein the major component of crystalline phase thereof is mag-

TABLE 1

|  |  |  | Examples of the invention |  |  |  |  |  |  |  | References |  |  |  |
|---|---|---|---|---|---|---|---|---|---|---|---|---|---|---|
|  |  |  | 1 | 2 | 3 | 4 | 5 | 6 | 7 | 8 | 1 | 2 | 3 | 4 |
| Chemical composition | Magnesia (MgO) | (Wt%) | 4.0 | 6.0 | 9.0 | 9.0 | 10.4 | 9.0 | 15.0 | 15.0 | 1.0 | 8.0 | 30.0 | Cordierite Ceramics |
|  | Alumina ($Al_2O_3$) | (Wt%) | 29.0 | 41.0 | 18.0 | 28.0 | 32.5 | 44.0 | 20.0 | 34.0 | 29.0 | 10.0 | 20.0 |  |
|  | Titania ($TiO_2$) | (Wt%) | 67.0 | 53.0 | 73.0 | 63.0 | 57.1 | 47.0 | 65.0 | 51.0 | 70.0 | 82.0 | 50.0 | ( MgO 13.8 |
| Composition ingredients | Magnesia | (Wt%) | — | 6.2 | — | 9.3 | — | — | — | — | 1.1 | — | — | $Al_2O_3$ 34.9 |
|  | Magnesium hydroxide | (Wt%) | 5.5 | — | 12.5 | — | — | — | 19.7 | 22.0 | — | 11.6 | — | $SiO_2$ 51.3 ) |
|  | Magnesium carbonate | (Wt%) | — | — | — | — | 20.0 | 14.5 | — | — | — | — | 48.0 |  |
|  | Alumina | (Wt%) | — | 40.1 | — | 27.3 | 29.0 | — | — | 31.2 | 28.3 | — | 14.8 |  |
|  | Aluminum hydroxide | (Wt%) | 37.7 | — | 24.0 | — | — | 50.4 | 25.2 | — | — | 13.9 | — |  |
|  | Rutile type titanium dioxide | (Wt%) | — | 53.7 | — | 63.4 | — | — | 55.1 | — | 70.6 | — | — |  |
|  | Anatase type ditanium dioxide | (Wt%) | 56.8 | — | 63.5 | — | 51.0 | 35.1 | — | 46.8 | — | 74.5 | 37.2 |  |
| Firing conditions | Temperature | (°C.) | 1600 | 1600 | 1500 | 1550 | 1550 | 1550 | 1400 | 1500 | 1400 | 1550 | 1450 |  |
|  | Retention time | (hr) | 5 | 3 | 10 | 5 | 10 | 10 | 5 | 5 | 10 | 5 | 5 |  |
| Second crystals | Rutile | (Wt%) | 2.5 | 1.0 | 5.0 | 0.5 | — | — | 2.0 | — | 10.0 | 31.5 | 5.0 |  |
|  | Spinel | (Wt%) | — | 0.5 | — | — | 0.7 | 1.2 | 3.5 | 7.5 | — | — | 25.0 |  |
|  | Corundum | (Wt%) | — | — | — | — | — | 1.0 | 0.5 | 1.5 | — | — | — |  |
| Coefficient of thermal expansion × $10^{-7}$ (1/°C.) (25° C. to 800° C.) |  |  | 12 | 2 | 14 | 10 | 7 | 8 | 19 | 15 | 26 | 31 | 60 | 19 |
| Melting point | | (°C.) | 1740 | 1700 | 1650 | 1630 | 1610 | 1620 | 1570 | 1550 | 1720 | 1600 | 1490 | 1450 |
| Temperature difference for quick heating and cooling | | (°C.) | 750 | 1200 | 650 | 800 | 900 | 850 | 550 | 600 | 400 | 350 | 250 | 500 |

The Examples 1 through 8 having a chemical composition of 2 to 20% by weight of magnesia (MgO), 10 to 68% by weight of alumina ($Al_2O_3$), and 30 to 80% by weight of titania ($TiO_2$) showed coefficients of thermal expansion of less than $20 \times 10^{-7}$ (1/° C.) for the range of 25° C. to 800° C., so that they showed larger withstanding temperature differences for quick heating and quick cooling than those of References 1 through 3 with chemical compositions outside that of the present invention, as demonstrated by the thermal shock tests by the electric furnace. Thus, the Examples of the invention proved excellent thermal shock-resistance.

Furthermore, the low-expansion ceramics of the present invention showed melting points which were about 100° C. to 300° C. higher than the melting point 1,450° C. of the cordierite ceramics of Reference 4.

As described in the foregoing, the low-expansion ceramics of the present invention has magnesium-aluminum-titanate phase as the major component of the crystalline phase thereof, so that the ceramics has a low coefficient of thermal expansion and a high melting point. Whereby, the ceramics of the invention can be widely used as ceramics material in the fields where high degrees of heat-resistance, thermal shock-resistance, wear-resistance, and corrosion-resistance are required: for instance, substrates for catalyst to purify automobile exhaust gas; carriers for catalytic combusnesium-aluminum-titanate phase, and the ceramics have a coefficient of thermal expansion of not more than $20 \times 10^{-7}$ (1/° C.) in a temperature range of 25° C. to 800° C. and a melting point of not lower than 1,500° C.

2. Low-expansion ceramics as defined in claim 1, wherein the magnesium-aluminum-titanate phase as the major component of the crystalline phase thereof is given by a chemical formula $Mg_{10x}Al_{8y}Ti_{5(1-x-y)}O_{(10+2y)}$, here $0.02 \leq x \leq 0.20$, $0.10 \leq y \leq 0.68$, and $0.20 \leq (x+y) \leq 0.70$.

3. Low-expansion ceramics as defined in claim 1, wherein the chemical composition thereof essentially consists of 3 to 17% by weight of magnesia (MgO), 15 to 62% by weight of alumina ($Al_2O_3$), and 35 to 75% by weight of titanium in terms of titanium oxide ($TiO_2$).

4. Low-expansion ceramics as defined in claim 3, wherein the magnesium-aluminum-titanate phase as the major component of the crystalline phase thereof is given by a chemical formula $Mg_{10x}Al_{8y}Ti_{5(1-x-y)}O_{(10+2y)}$, here $0.03 \leq x \leq 0.17$, $0.15 \leq y \leq 0.62$, and $0.25 \leq (x+y) \leq 0.65$.

5. Low-expansion ceramics as defined in claim 1, wherein the major component of the crystalline phase thereof is magnesium-aluminum-titanate phase and contains not more than 20% of by weight at least one crystal selected from the group consisting of rutile, spinel, and corundum.

6. Low-expansion ceramics as defined in claim 1, wherein a shape of ceramics is a honeycomb structure.

7. A method of producing low-expansion ceramics comprising steps of preparing a batch of compounds so as to provide a chemical composition of 2 to 20% by weight of magnesia, 10 to 68% by weight of alumina, and 30 to 80% by weight of titanium in terms of titanium oxide; shaping the batch; drying the body thus formed, and firing the shaped body at 1,300° C. to 1,700° C. for 0.5 to 48 hours, whereby ceramics have a magnesium-aluminum-titanate phase as main component of crystalline phase thereof, a coefficient of thermal expansion of not more than $20 \times 10^{-7}$ (1/° C.) in a temperature range of 25° C. to 800° C., and a melting point of not lower than 1,500° C.

8. A method of producing low-expansion ceramics as defined in claim 7, wherein said batch provides a chemical composition consisting essentially of 3 to 17% by weight of magnesia, 15 to 62% by weight of alumina, and 35 to 75% by weight of titanium in terms of titanium oxide.

9. A method of producing low expansion ceramics as defined in claim 7, wherein said compounds so selected as to provide the chemical composition of 2 to 20% by weight of magnesia, 10 to 68% by weight of alumina, and 30 to 80% by weight of titanium in terms of titanium oxide are selected from the group consisting of magnesia, magnesia carbonate, magnesium hydroxide, alumina, aluminum hydroxide, anatase type titanium dioxide, and rutile type titanium dioxide.

10. Low-expansion ceramics having a magnesium-aluminum-titanate phase as main component of crystalline phase thereof, a coefficient of thermal expansion of not more than $20 \times 10^{-7}$ (1/° C.) in a temperature range of 25° C. to 800° C., and a melting point of not lower than 1,500° C., said low-expansion ceramics being produced by a process comprising the steps of preparing a batch of compounds so as to provide a chemical composition of 2 to 20% by weight of magnesia, 10 to 68% by weight of alumina, and 30 to 80% by weight of titanium in terms of titanium oxide; shaping said batch into a body; drying said body thus formed, and firing the shaped body at 1,300° C. to 1,700° C. for 0.5 to 48 hours.

11. Low-expansion ceramics as defined in claim 10, wherein said batch provides a chemical composition consisting essentially of 3 to 17% by weight of magnesia, 15 to 62% by weight of alumina, and 35 to 75% by weight of titanium in terms of titanium oxide.

12. Low-expansion ceramics as defined in claim 10, wherein said compounds so selected as to provide the chemical composition of 2 to 20% by weight of magnesia, 10 to 68% by weight of alumina, and 30 to 80% by weight of titanium in terms of titanium oxide are selected from the group consisting of magnesia, magnesium carbonate, magnesium hydroxide, alumina, aluminum hydroxide, anatase type titaniun dioxide, and rutile type titanium dioxide.

* * * * *